United States Patent [19]

Kaun

[11] Patent Number: 5,397,661
[45] Date of Patent: Mar. 14, 1995

[54] BATTERY CELL FEEDTHROUGH APPARATUS

[75] Inventor: Thomas D. Kaun, New Lenox, Ill.

[73] Assignee: The University of Chicago, Chicago, Ill.

[21] Appl. No.: 179,924

[22] Filed: Jan. 12, 1994

[51] Int. Cl.⁶ .............................................. H01M 2/06
[52] U.S. Cl. .................................... 429/181; 429/185
[58] Field of Search ............... 429/181, 184, 185, 174, 429/102, 103, 104; 174/50, 61, 152 GM

[56] References Cited

U.S. PATENT DOCUMENTS

| | | |
|---|---|---|
| 4,233,372 | 11/1980 | Bro et al. ........................... 429/174 |
| 4,313,259 | 2/1982 | Kaun et al. . |
| 4,360,574 | 11/1982 | Park ................... 429/103 X |
| 4,460,664 | 7/1984 | Jurva ................... 429/181 |
| 4,508,797 | 4/1985 | Knoedler et al. ............ 429/184 |
| 4,904,551 | 2/1990 | Denoncourt et al. ......... 429/181 |
| 5,194,298 | 3/1993 | Kaun . |

*Primary Examiner*—Anthony Skapars
*Attorney, Agent, or Firm*—Reinhart, Boerner, Van Deuren, Norris & Rieselbach

[57] ABSTRACT

A compact, hermetic feedthrough apparatus comprising interfitting sleeve portions constructed of chemically-stable materials to permit unique battery designs and increase battery life and performance.

20 Claims, 2 Drawing Sheets

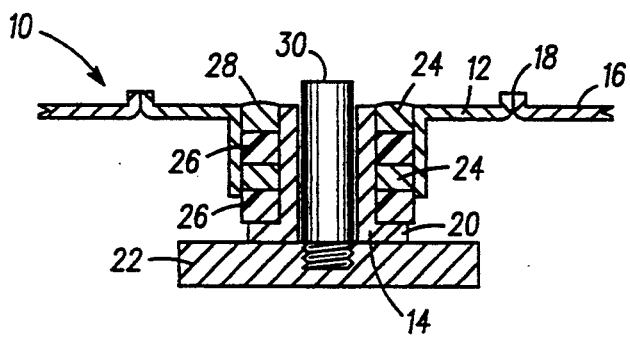
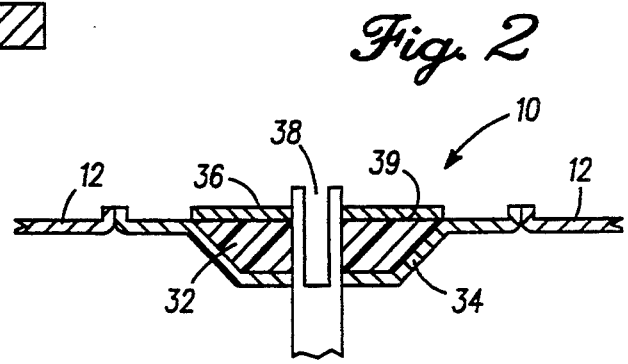
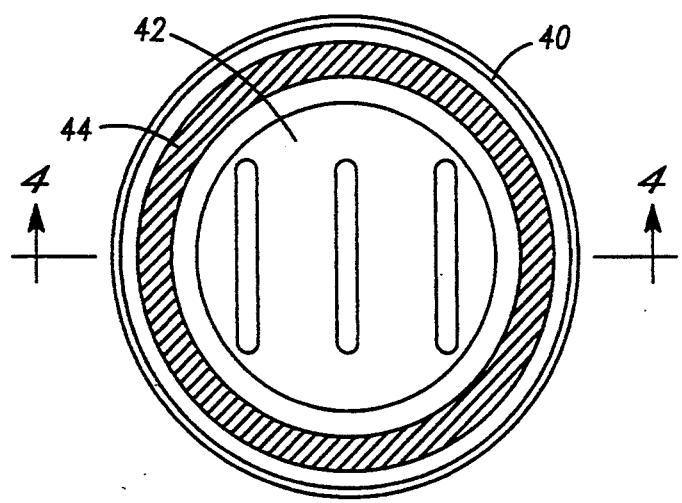
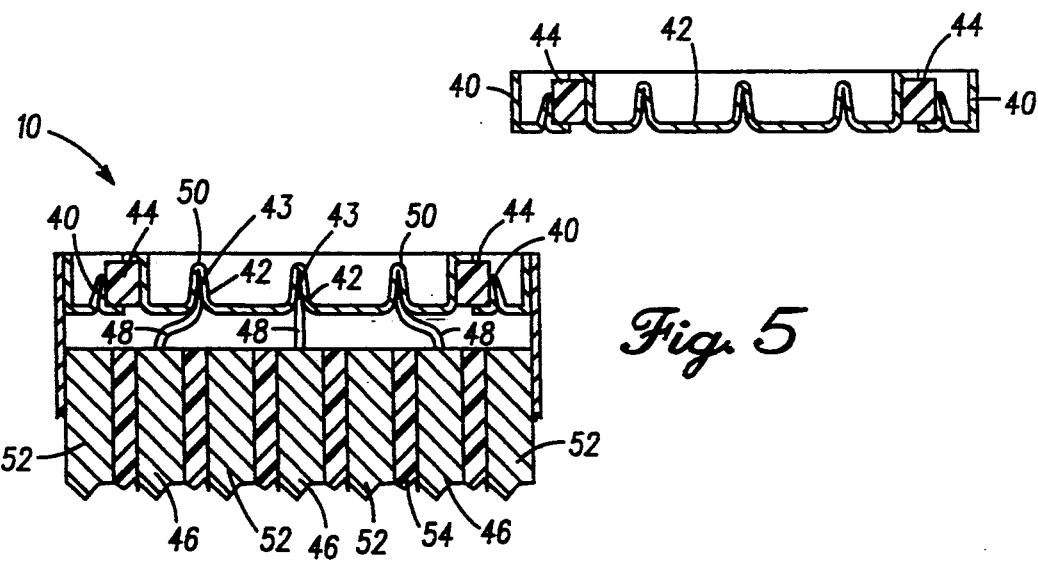

Fig. 6A
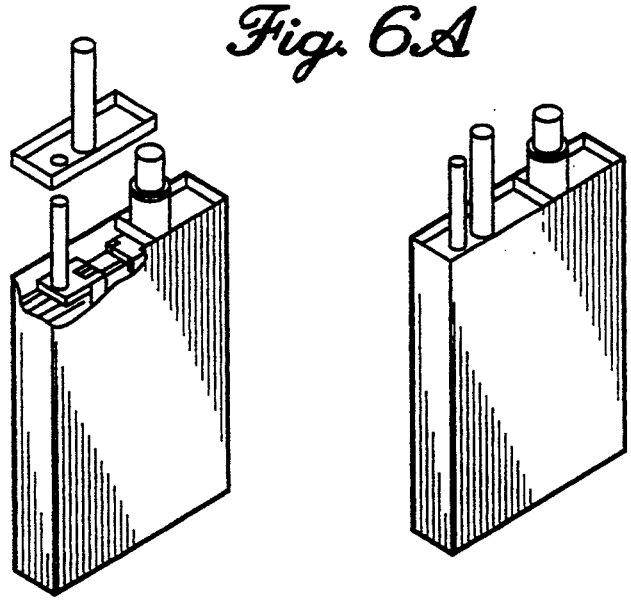
Fig. 6B
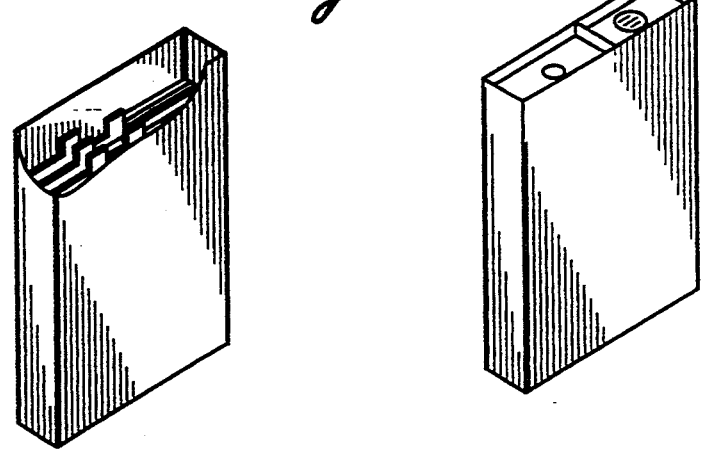
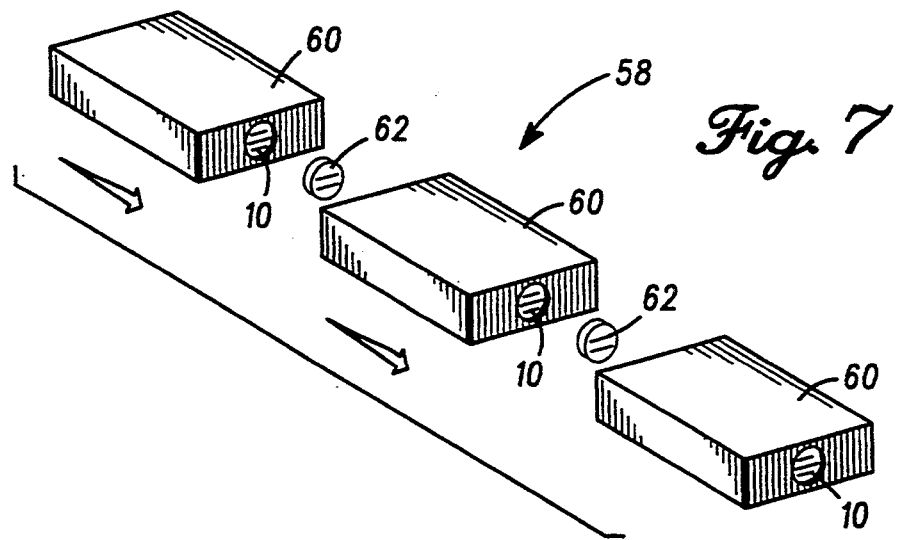
Fig. 7

BATTERY CELL FEEDTHROUGH APPARATUS

CONTRACTUAL ORIGIN OF THE INVENTION

The United States Government has rights in this invention pursuant to Contract No. W-31-109-ENG-38 between the United States Department of Energy and The University of Chicago, representing Argonne National Laboratory.

BACKGROUND OF THE INVENTION

Conventional secondary electrochemical cells include a plurality of plate-like positive and negative electrodes contained within a prismatic housing. The electrodes are aligned in an alternating positive/negative array and are typically separated by layers of frangible porous electrically insulative material facing their major side surfaces.

The electrochemically active material of the individual electrodes can be of any type suitable. Alloys of alkali metals or alloys of alkaline earth metals containing alloying materials of aluminum, silicon, magnesium and combinations thereof are used for the negative electrodes. The positive electrodes generally contain chalcogenides or preferably transition metal chalcogenides as electrochemically active material. Both the positive and the negative electrodes include an electrolyte, such as mixtures of alkali metal halides, mixtures of alkaline earth metal halides, or combined mixtures thereof. Cells containing these components and types of active materials and electrolytes are well known and described more fully in U.S. Pat. No. 4,313,259.

Electrodes of like polarity are interconnected by one of two busbars electrically coupled to the cell terminals, which extend through and are electrically insulated from the cell wall of the housing by feedthroughs. The electrical busbars are typically spaced lengthwise from one another within the cell housing and are each connected to individual electrodes by electrical conductors.

Full size batteries of this type are comprised of many cells grouped together in an end-to-end or face-to-face arrangement in a common battery housing and electrically connected in series to produce higher effective voltage output. Even a thin cell version is capable of very high current density.

The batteries are designed to operate at temperatures in the range of 375°–500° C. Existing battery designs, involving electrolytes normally fluid at cell operating temperatures, are concerned with electrolyte leakage past the separator between adjacent positive and negative electrodes. Leakage could consume the electrolyte by electrolytic decomposition and could produce metallic deposits sufficient to cause battery failure by shorting out the adjacent collectors or to the external battery housing.

In general, and with respect to typical cell designs, a positive feedthrough requires an electrical insulating seal. A negative feedthrough is part of the cell can, which is at the negative electrode potential. The positive electrode is, therefore, attached to the feedthrough, which must remain free of short circuits throughout the cell lifetime and must also prevent electrolyte escape from the cell. Feedthroughs currently used in lithium alloy/iron sulfide batteries are of a mechanical compression design, with a lower solid insulator of beryllia (BeO) and an upper insulator of alumina ($Al_2O_3$). The actual seal component thereof, may be formed of a compressed bed of boron nitride (BN) powder, which is effective in preventing electrolyte escape, but is not fully hermetic.

Conventional ceramics such as MgO, BeO, $Y_2O_3$, $Al_2O_3$, BN and AlN, however, have substantial drawbacks, such as, very poor mechanical properties, including poor fabricability and limited chemical stability, when exposed to nonaqueous corrosive environments at high temperature. Furthermore, the melting point of the conventional ceramics is in excess of 2,000° C., which poses significant processing problems. Further, the thermal expansion coefficient of such ceramics is often completely incompatible with adjacent metal components present. If bonding to metals is necessary, the metal component (the brazing agent) must wet the ceramic or an intermediate glass phase must be used. However, such conventional glasses are not chemically stable nor operable at higher temperatures normally encountered in highly corrosive environments of interest. If such unstable brazes, glasses, or ceramics are used, the resulting reaction products can cause formation of undesired electrical conductor materials, rather than remaining as the desired insulator material.

Resistance is another problem associated with previous cell and feedthrough designs. Resistance mapping measurements made for various state-of-the-art lithium alloy/iron sulfide cells showed that approximately 50% of the overall cell resistance was external to the electrode stack and due, specifically, to the interelectrode connections (busbars) and terminal to interelectrode connections. As a result, the power output of such cells was only 50% of the theoretical level.

The search for an efficient, effective feedthrough apparatus meeting the requirements outlined above has been an ongoing concern in the art. One approach, which has met with limited success, involved reducing interconnecting impedance by increasing the size of copper-cored cell terminals and using massive interelectrode connections. In such a fashion, total cell resistance was reduced and that external to the electrode stack was about one-third of that earlier observed.

However, increasing feedthrough and terminal size results in a corresponding enlargement of the cell. In some instances, the feedthroughs are relatively large (on the order of several inches) and necessary to contain the seal housing and powder. As a result, the seals and terminals extend considerably beyond the battery header, substantially increasing the overall size of a cell system. The increase in size, however, does not necessarily promote longer cell life without electrolyte leakage and short circuiting. Alternatively, restrictions on such compressive designs tends to limit terminal diameters to the extent multiple terminal pins may be required for high current load.

In summary, a considerable number of problems and concerns exist with respect to previous cell designs, most are related to inefficient battery construction and operation, and result from the type of feedthrough/seal apparatus currently used.

OBJECTS OF THE INVENTION

It is an object of this invention to provide an apparatus for insulating an electrochemical cell and promoting the withdrawal of energy therefrom, overcoming the problems and deficiencies of the prior art including those mentioned above.

It is an object of this invention to provide a compact design and/or configuration for a hermetic feedthrough apparatus for high temperature battery cells, where the feedthrough is of a non-compressive type.

It is another object of this invention to provide a feedthrough apparatus which substantially reduces cell impedance while reducing cell volume.

It is another object of this invention to provide a compact feedthrough and header design such that the top of the cell housing directly constrains the top edge of the cell electrodes, without use of additional constraining materials, and that improved methods of cell assembly are possible.

It is a further object of this invention to provide a feedthrough and design therefore such that the feedthrough may be located in a cell sidewall and connectable with adjacent cells in a multiple cell arrangement.

It is yet another object of this invention to provide a feedthrough apparatus constructed of corrosion resistant materials such that the feedthrough is stable within a molten salt electrolyte environment.

It is an object of this invention to provide a battery assembly incorporating a hermetic feedthrough to enable higher specific energy and power at the battery-level.

It is a further object of this invention to provide a hermetic feedthrough and related cell components comprised of materials such that cell fabrication is made more efficient and new battery/feedthrough designs are available.

These and other important objects will be apparent from the following descriptions of this invention.

SUMMARY OF THE INVENTION

This invention is a compact, light weight battery feedthrough component constructed of novel materials which have permitted new designs and resulted in increased battery life and enhanced performance. The feedthrough apparatus and battery assemblies described herein are chemically-stable such that they may be used in conjunction with high temperature battery systems, thus overcoming certain well-known problems and deficiencies inherent to the battery assemblies currently utilized.

The present invention is directed to an apparatus for insulating an electrochemical cell and promoting the withdrawal of energy therefrom and includes (1) a first sleeve portion bondable to an outer cell cover, (2) an inside second sleeve portion having a conductive relationship with the electrode terminals of the cell, and (3) means coupling the sleeve portions to hermetically seal the electrochemical cell.

The cell is be constructed in such a way that the first and second sleeve portions are recessed substantially below the outer cell cover, and the sealing means is a plurality of interspaced bushings separated with a fusible ceramic material. In preferred embodiments, the bushings are constructed from a ceramic material such as aluminum oxide, magnesium oxide, boron nitride, aluminum nitride, and beryllium oxide. The fusible ceramic material is selected from the group consisting of sulfides, selenides, and combinations thereof where the ceramic material includes at least two chemical elements. In highly preferred embodiments, the sealing means is a single bushing comprised of fusible ceramic and can include preferably a silane coating.

In highly preferred embodiments, the second sleeve portion is in a mating relationship with the electrode terminals and the first and second sleeve portions are constructed of a refractory such as molybdenum, tungsten, titanium, titanium nitride, coated-nickel and iron and alloys and couples thereof. Such coated metals may be coated with a ceramic or another metal such as molybdenum.

A feedthrough apparatus of this invention can, likewise, be arranged and configured such that a first sleeve and a second portion are recessed substantially below the outer cell cover. The inner sleeve portion has a substantially conductive relationship with at least one electrode terminal of the cell. The portions are coupled such that the cell is hermetically sealed. In highly preferred embodiments, the sealing means is a plurality of interspaced bushings separated one from the other with a fusible ceramic material—the bushings and ceramic materials as described more fully above.

The cell may also include an inter-cell connector disposed inward from the second portion. The connector is in a substantially conductive relationship with an electrode distribution plate. As described above, the second portion is in a mating relationship with positive electrode terminals and is substantially disk-shaped. The mating relationship can be secured through use of a ceramic material, such as that described herein, to fuse the terminal to the sleeve. Sulfides are preferred. In highly preferred embodiments, the feedthrough apparatus is arranged and configured to receive means for connecting the subject cell to a second cell for battery assembly. The connecting means is, preferably, a conductive disk.

As previously noted, the feedthrough apparatus, as revealed through this invention, has certain advantages, most of which relate directly to the materials from which they are constructed and the designs which are available therethrough. In general, this invention relates to a hermetic feedthrough for high temperature battery cells, such as Li-alloy/FeS, Na/MCl$_2$, and Na/S batteries and, more particularly, to a compact feedthrough design where the feedthrough is of a non-compressive type. In preferred embodiments, the design can be characterized as more compact than earlier compressive seals, the feedthroughs can be recessed below cell headers. As such, they allow for larger openings for larger terminals with the capacity for higher current loads. Furthermore, they are compatible with molten salt electrolytes.

The ceramic materials described herein for use in the construction of the present feedthrough inventions are preferentially non-transition metal sulfides, selenides, and combinations of sulfides and selenides. In general, these materials are excellent electrical insulators unless otherwise modified with conductive phases. However, other similar materials can be employed in a manner consistent with this invention and with the same excellent results. Representative binary, ternary, and quaternary element chalogenide ceramic phases contemplated for use in the construction and assembly of feedthrough, battery, and related apparatus are as more fully described in U.S. Pat. No. 5,194,298, incorporated in its entirety by reference herein and, in particular, Tables I and II thereof.

Sulfide and/or selenide based ceramic materials can be prepared in accordance with the methods and procedures described in U.S. Pat. No. 5,194,298 and without using a significant amount of filler material (e.g.. only 0–5 wt. % CaO in CaAl$_2$S$_4$). The fusible sulfide and/or selenide base materials exhibit low viscosities and act to readily wet the material to which bonding is sought. For example, wetting angles on metals are $\leq 20°$, and generally approach $0°$. As applied to metal or ceramic surfaces at temperatures above their melting point (Table III in U.S. Pat. No. 5,194,298), surface bonding is readily attained with $\geq 95\%$ coverage and wetting occurs over large distances on the surface. In the application of a material for parts assembly, a minor amount of inert filler can be incorporated to the localized area of application. The excellent wetting and bonding of the subject ceramic compositions enables use of the ceramics for laminating metal to metal, ceramic to metal, and ceramic to ceramic if the coefficients of thermal expansion are sufficiently compatible.

For example, the single-phase ceramic $Ca_2SiAl_2S_7$ exhibits improved bonding with molybdenum. The $5 \times 10^{-6}/°C$. coefficient of thermal expansion matches molybdenum metal quite well and has an added feature of the aggressive bonding nature of the silicon component to the metal substrate. The mixed-sulfides described in U.S. Pat. No. 5,194,298 are generally prepared by mixing powders of the component sulfides and heating to $\leq 1100°$ C. in an argon atmosphere for one hour. Such sulfide products can be reduced to powders, blended and heated again to increase homogeneity.

The chalcogenide compositions utilized with respect to the present invention are varied to produce a desired melting temperature and ensure thermal and chemical compatibility to specific metal components. As shown in Table I of U.S. Pat. No. 5,194,298, the single-phase sulfide-based compositions have melting points of $\leq 1200°$ C., including sulfides such as $Y_2S_3$ and $CaS$ which do not melt but decompose or sublime above $2000°$ C. These melting points are below that of the transition metals Fe and Ni, as well as below that of the refractory metals Mo and W. These low melting temperatures provide the advantage of enabling metal/ceramic bond formation within a conventional NiCr-element furnace.

On metal surfaces the ceramic is self-fluxing because surface oxides on metals react with sulfur and selenium, for example, to form a residual metal and sulfur or selenium oxide gas which leaves the surface as a volatile. Bonding is carried out in an inert gas furnace, although another viable alternative is the use of welding equipment and lasers to locally heat and fuse the ceramics to bond the parts.

After bond formation a steel part is bright in appearance to the eye, and a clean steel/sulfide and/or selenide ceramic material bonds tenaciously to the metal surface. A minor amount of metal sulfide generated in the chemical reaction at the interface diffuses into the sulfide and/or selenide ceramic without substantially changing any of the ceramic properties, such as its electrically insulating character.

To aid application of a ceramic sulfide and/or selenide material (in powder form) a glue-like mixture can be prepared comprised of non-reacting organic vehicles, solvents and polymers (e.g., hexane and polyisobutylene). The organic vehicles evaporate or decompose, leaving the ceramic sealant powder in the desired location for bond formation. The glue-like mixtures are troweled or painted on the area to be bonded to the chalcogenide ceramic. The chalky property of the ceramic presents the advantages of powder adherence on bonding surfaces without need of organic vehicles.

The ceramic can also serve as a protective coating for metals and other ceramics. Coatings can be applied by the techniques described hereinbefore. In addition, one can spray a molten form of the ceramic on a material surface, or dip a material to be surface bonded (or laminated) in a bath of molten ceramic. The unique properties of the aforementioned ceramic materials, including strong metal bond formation, facilitate the advanced design and fabrication of the feedthrough apparatus of this invention.

Inasmuch as such ceramics can be formulated to match thermal expansion co-efficients for most metals and ceramics, a hermetic feedthrough seal may be constructed that is lighter weight and more compact than the conventional packed-powder apparatus. Formation of hermetic seals for use with terminals having diameters of 0.6 cm or larger is a primary concern in the field of high-temperature $Li/FeS_2$ cells, to enable higher, specific energy and power at the battery-level. As described herein, the metal components of the inventive feature apparatus are lightweight, and use of the disclosed ceramics alleviates the need to maintain powder compression. Therefore, unlike a conventional feedthrough for prismatic, multiplate cells, the hermatic feedthroughs of this invention can be extremely compact and are not required to extend above the cell header. The feedthrough apparatus of this invention also allow for use of an intercell connector to directly contact the distribution plate within the cell. Resistance from multiconnections between the electrodes joining cells is, thus, reduced.

The fusible, chalcogenide ceramics described herein are stable in the severely corrosive molten-salt environment of a $Li-Al/FeS_2$ battery, and are ideally suited for use in conjunction with a feedthrough apparatus of this invention. Even though such a battery would be housed in a suitably dry setting, the ceramics are water-sensitive. Therefore, a secondary, water/humidity-insensitive component can be added externally to the seal to safeguard the cells during battery assembly. The external seal of this type need not be corrosion resistant because it is hermetically sealed from the molten-salt battery environment. As described above, silane-based materials are preferred. When so employed, this external seal is formed first and ceramic bushings (MgO or $Al_2O_3$) are used to position the feedthrough components. Powders of a chalcogenide or mixed chalcogenide sealant are loaded in the annulus of the feedthrough. A small load is placed on to the internal ceramic bushing to set the piece into place as the ceramic is fused at or about $1100°$ C.

BRIEF DESCRIPTION OF THE DRAWINGS

FIG. 1 is a partial cross-sectional view of a hermetic feedthrough apparatus, in accordance with this invention, for battery application, including use in conjunction with a Li-Alloy/Metal Sulfide Prismatic Multiplate Cell;

FIG. 2 is a partial cross-sectional view of a hermetic feedthrough apparatus, in accordance with this invention; showing a preferred single chalogenide ceramic bushing/preform and ferrule;

FIG. 3 is a schematic top view of a feedthrough apparatus of this invention having a diaphragm- or disk-like design;

FIG. 4 is a partial cross-sectional view of the diaphragm/disk feedthrough of FIG. 3 along line 4—4;

FIG. 5 is a partial cross-sectional view of a feedthrough apparatus having a diaphragm- or disk-like design, showing communication thereof with electrode tabs;

FIG. 6A is a schematic representation of a conventional feedthrough-battery case assembly;

FIG. 6B, by comparison, is a schematic representation of a diaphragm/disk feedthrough-battery assembly, in accordance with the present invention; and FIG. 7 is a schematic representation of a head-to-tail type of battery assembly, through use of a diaphragm/disk feedthrough apparatus, in accordance with the present invention.

DETAILED DESCRIPTIONS OF THE PREFERRED EMBODIMENTS

The figures illustrate embodiments of the inventive hermetic feedthrough apparatus, and related battery assemblies, as described more fully herein.

As shown in FIG. 1 a hermetic feedthrough apparatus of this invention may be used in conjunction with Li-Alloy/Metal Sulfide prismatic multiplate battery cells. The design, as represented in FIG. 1, shortens overall feedthrough height values to approximately ½ inch and provides elongated sealing services in a non-compressive arrangement. Feedthrough 10 includes a first/outer sleeve portion 12 and an interfitted second sleeve portion 14, such sleeve arrangement adjacent to and substantially parallel with the battery terminal (not shown in FIG. 1) and recessed substantially below cell header 16. Outer flange sections 18 and 20 of outer sleeve 12 and inner sleeve are bonded to header 16 and distribution plate 22, respectively. Interfitted sleeve portions 12 and 14 are hermetically bonded together by chalcogenide ceramic/adhesive 24, together with ceramic bushing 26. Moisture barrier 28 is external to both chalcogenide adhesive 24 and bushing 26. The distribution plate and sleeve arrangement can be fabricated separately as a one-piece assembly and installed in a header cut-out, the adjacent lips of the cut-out and sleeve welded to complete the cover and cell structure.

The interfitted sleeve arrangement, as shown in FIG. 1, is adjacent and generally parallel to the terminal to provide elongated surfaces for the hermetic seal. The feedthrough apparatus of this invention also contemplates an assembly of the distribution plate supporting the bonded sleeve arrangement where, as shown, an upper horizontal flange of the outer sleeve fits in a header cutout and is welded to the adjacent header, to complete the outer cell cover. As best shown in FIG. 1, the feedthrough apparatus of the present invention permits-use of inter-cell connector 30 to function as the interelectrode connection and terminal. Generally, connector 30 is comprised of copper and directly contracts distribution plate 22. As described above, resistance from multiple connections between the electrodes of adjoining cells is, thus, reduced. Furthermore, the volume to accommodate the massive interconnects of the prior art is eliminated and the header of the multi-plate cell can be made more compact.

As shown in FIG. 2, the feedthrough apparatus of FIG. 1 can be modified such that a chalcogenide preform 32 is substituted for bushings 26 (of FIG. 1). In such a manner, the design of the feedthrough apparatus can be simplified to a single preformed chalcogenide ceramic seal between first sleeve 34 and second sleeve 36. As shown in FIG. 2, ceramic ferrule/ring 39 can support terminal component 38. The feedthrough/battery assembly (distributor plate and interconnector not shown) of FIG. 2 may be constructed using terminals and sleeves of molybdenum metal and the like. The feedthrough/battery arrangement illustrated in FIG. 2 is not limited to use with a rod-shaped terminal. It is understood that other configurations, such as a rectangular tab terminal, are likewise useful without deviating from the scope of this invention.

Referring to FIG. 3, a feedthrough apparatus of the present invention can be embodied in a diaphragm-like design or configuration. The compact feedthrough includes negative pole header, which is secured to the cell cover, and disk-shaped positive pole interface 42. A chalcogenide ceramic ting 44 (preferably a sulfide and/or selenide) is positioned therebetween to bond the metal components, provide an insulating function and hermetically seal the cell assembly. In highly preferred embodiments, the positive pole interface is a molybdenum embossed sheet metal disk and the ceramic ring is constructed of a chalcogenide material, as described herein, compatible with the metal component. As best shown in FIG. 4, the diaphragm feedthrough of FIG. 3, along line 4—4, is configured and arranged to be substantially continuous and recessed below the surface of the outer cover of the cell, thus reducing battery volume. Likewise a diaphragm feedthrough, as shown in FIGS. 3 and 4, can reduce cell impedance, in a manner much preferable to the massive busbar and copper-core terminals of the prior art.

FIG. 5 schematically shows the diaphragm-like feedthrough apparatus of FIGS. 3 and 4, in communication with positive electrodes 46 and the corresponding terminals 48. The terminals are crimped or otherwise fused within embossings 50 of positive pole interface 42. As shown in FIG. 5, ceramic coating 43 facilitates fusion of terminals 48 to interface 42. Coating 43 is substantially conductive, such that current is withdrawn from the cell through embossings 50. Electrically-conductive ceramic 43 at the positive pole interface 42-50 can be fused by applying heat to embossings 50 after cell assembly. By way of reference, a cell assembly for use in conjunction with feedthrough 10 includes negative electrodes 52 and separator material 54.

FIGS. 6A and 6B illustrate the volume and weight reductions achieved through use of a diaphragm-like feedthrough apparatus, of the type shown in FIGS. 3, 4 and 5. Conventional high-powered feedthroughs require increased battery case volumes to accommodate the large terminal connections. However, cells constructed with the diaphragm-like feedthroughs consistent with the present invention enable increased power and energy per cell weight with a decreased volume demand. Typically, through use of a diaphragm feedthrough apparatus in conjunction with a battery assembly such as shown in FIGS. 6A and B, cell weight may be reduced by 18% and volume by 20%

As mentioned above, the sulfide and/or selenide ceramic materials described herein, and the hermetic seals constructed therefrom, are stable when in contact with molten salt electrolytes. Multiple cell arrangements are thus possible, using unique configurations. As shown schematically in FIG. 7 a head-to-tail battery assembly can be constructed. Assembly 58 is comprised of cells 60 with the cell-to-cell connection made via a mating plug 62. Without limiting the scope of the invention, plug 62 can comprise a copper disk which fits within a diaphragm feedthrough apparatus. It is understood that various other configurations can be employed, consistent with the inventions described herein.

EXAMPLES

The following non-limiting examples illustrate the benefits and advantages achieved through use of the feedthrough apparatus described herein:

Example 1

The hermeticity of feedthrough components using a sulfide ceramic as a sealant was confirmed for high temperature use. Two components with ½" I.D. outer sleeves were repeatedly heated to 450° C. and cooled to 25° C. A 0.07 millitorr vacuum measured leak-tightness. One feedthrough contained a single ¼" dia. steel terminal; the other contained 5 1/32" dia. wire terminals. The feedthroughs were fabricated with Aremco $Al_2O_3$ cement to position parts within the outer sleeve of the feedthrough. Subsequent vacuum testing was unsuccessful. Then a layer of sulfide ceramic (15 wt % CaO in $CaAl_2S_4$) was applied to the bottom annulus of the feedthrough assembly at 1100° C. in argon. Repeating the procedure as described above, the sulfide ceramic sealant provided the excellent hermeticity required for high temperature use.

Example 2

Feedthroughs fabricated with packed-powder components and mixed-chalcogenide ceramics and were tested for hermeticity, thermal cycle durability (400° C. to room temperature) and chemical stability (by potentiometry, 1.6 volts versus LiAl). After 8 thermal cycles (3-h heat/3-h cool), the vacuum leak check exhibited at 100 $\mu M$ vacuum. Additionally, no change in feedthrough resistance was noted after a 200h chemical stability test.

While the principles of this invention have been described in connection with specific embodiments, it should be understood clearly that the descriptions are made only by way of example and are not intended to limit the scope of the invention. For example, feedthrough sizing and dimension, and inter-cell connection designs can be modified to compliment available battery configurations. Likewise, battery design may be modified through implementation of the feedthrough apparatus of this invention as, for example, through use of side terminals. Additional configurations, consistent with the inventions described herein are envisioned. Other advantages and features of the invention will become apparent from the claims hereinafter, with the scope of the claims determined by the reasonable equivalents as understood by those skilled in the art.

What is claimed is:

1. An apparatus for insulating an electrochemical cell, having positive and negative electrodes and terminals thereon, and promoting the withdrawal of energy therefrom, comprising:
    a first sleeve portion bondable to an outer cover of the cell;
    a second sleeve portion disposed inwardly from said first portion, having a substantially conductive relationship with the electrode terminals of the cell; and
    means coupling said first and second sleeve portions to hermetically seal the eletrochemical cell.

2. An apparatus as defined in claim 1 wherein said first and second sleeve portions are recessed substantially below the outer cell cover.

3. The apparatus as defined in claim 1 wherein said sealing means comprises a plurality of interspaced bushings separated one from the other with a fusible ceramic material.

4. The apparatus as defined in claim 3 wherein:
    said bushings are comprised of a ceramic selected from the group consisting of aluminum oxide, magnesium oxide, boron nitride, aluminum nitride, and beryllium oxide; and
    said fusible ceramic material is selected from the group consisting of sulfides, selenides, and combinations thereof, said fusible ceramic including at least two chemical elements.

5. The apparatus as defined in claim 3 whereto said sealing means further includes means to exclude external moisture.

6. The apparatus as defined in claim 1 wherein said sealing means is a bushing comprised of a fusible ceramic material selected from the group consisting of sulfides, selenides and combinations thereof, said fusible ceramic including at least two chemical elements.

7. The apparatus as defined in claim 2 wherein said second sleeve portion is in a mating relationship with terminals of the electrodes.

8. The apparatus as defined in claim 7 wherein said first and second sleeve portions are comprised of a refractory selected from the group consisting of molybdenum, tungsten, titanium, titanium nitride and coated nickel iron and alloys and couples thereof.

9. The apparatus as defined in claim 7 wherein said sealing means is a fusible ceramic ring, said fusible ceramic selected from the group consisting of sulfides, selenides, and combinations thereof and including at least two chemical elements.

10. The apparatus as defined in claim 9 wherein said sealing means further includes means to exclude external moisture.

11. An electrochemical cell of the type including negative and positive electrodes, interelectrode connections, at least one electrode terminal, a feedthrough, and a cell cover, the improvement comprising:
    a feedthrough having a first sleeve portion bondable to the cell cover and a second portion disposed inwardly from said first portion, having a substantially conductive relationship with at least one electrode terminal of the cell; and
    means coupling said first sleeve and second portions to hermetically seal the electrochemical cell.

12. The electrochemical cell as defined in claim 11 wherein said first sleeve and second portions are recessed substantially below the outer cell cover.

13. The electrochemical cell as defined in claim 12 wherein said sealing means comprises a plurality of interspaced bushings separated one from the other with a fusible ceramic material.

14. The electrochemical cell as defined in claim 13 wherein:
    said bushings are comprised of a ceramic selected from the group consisting of aluminum oxide, magnesium oxide, boron nitride, aluminum nitride, and beryllium oxide; and
    said fusible ceramic material is selected from the group consisting of sulfides, selenides, and combinations thereof, said fusible ceramic including at least two chemical elements.

15. The electrochemical cell as defined in claim 11 further including an inter-cell connector disposed inward from said second portion, said connector in a substantially conductive relationship with an electrode distribution plate.

16. The electrochemical cell as defined in claim 12 wherein said second portion is substantially disk-shaped, said second portion in a mating relationship with the positive electrode terminals.

17. The electrochemical cell as defined in claim 16 wherein said second portion is comprised of a refractory selected from the group consisting of molybdenum, tungsten, titanium, titanium nitride, and coated nickel and iron and alloys and couples thereof; and said mating relationship is secured by a fusible, conductive ceramic material.

18. The electrochemical cell as defined in claim 12 wherein said sealing means is a fusible ceramic ting, said fusible ceramic selected from the group consisting of sulfides, selenides, and combinations thereof, and including at least two chemical elements.

19. The apparatus as defined in claim 18 wherein said feedthrough is configured and arranged to receive means for connecting the cell to a second cell such that a battery having a plurality of cells is assembled.

20. The apparatus as defined in claim 19 wherein said connecting means is a conductive disk.

* * * * *